(12) United States Patent
Mishra et al.

(10) Patent No.: US 11,694,478 B2
(45) Date of Patent: *Jul. 4, 2023

(54) SENTIMENT ANALYSIS OF CONTENT USING EXPRESSION RECOGNITION

(71) Applicant: Actimize LTD., Ra'anana (IL)

(72) Inventors: Vaibhav Mishra, Uttar Pradesh (IN); Steven Logalbo, McKinney, TX (US); Dalvi Soham Pandurang, Maharashtra (IN)

(73) Assignee: Actimize LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,316

(22) Filed: Jun. 13, 2022

(65) Prior Publication Data

US 2022/0358789 A1  Nov. 10, 2022

Related U.S. Application Data

(63) Continuation of application No. 16/907,247, filed on Jun. 21, 2020, now Pat. No. 11,393,250.

(51) Int. Cl.
| | |
|---|---|
| G06V 40/16 | (2022.01) |
| H04N 7/14 | (2006.01) |
| G06N 20/00 | (2019.01) |
| G06F 17/16 | (2006.01) |
| G06N 3/084 | (2023.01) |
| G06N 3/048 | (2023.01) |

(52) U.S. Cl.
CPC ............ *G06V 40/176* (2022.01); *G06F 17/16* (2013.01); *G06N 3/048* (2023.01); *G06N 3/084* (2013.01); *G06N 20/00* (2019.01); *H04N 7/141* (2013.01)

(58) Field of Classification Search
CPC combination set(s) only.
See application file for complete search history.

(56) References Cited

U.S. PATENT DOCUMENTS

| | | | |
|---|---|---|---|
| 2016/0042226 A1* | 2/2016 | Cunico | H04N 7/152 382/103 |
| 2016/0300135 A1* | 10/2016 | Moudy | H04L 67/01 |
| 2020/0111173 A1* | 4/2020 | Benfield | G06F 16/4393 |
| 2020/0310842 A1* | 10/2020 | Yen | G06F 9/453 |
| 2022/0104884 A1* | 4/2022 | Leiderman | A61F 9/00736 |
| 2022/0180467 A1* | 6/2022 | Koker | G06F 12/0893 |

* cited by examiner

*Primary Examiner* — Phung-Hoang J Nguyen
(74) *Attorney, Agent, or Firm* — Soroker-Agmon-Nordman; Sharone Godesh; Daniel Schatz (57) ABSTRACT

A computerized method for providing a sentiment score by evaluating expressions of participants during a video meeting is provided herein. The computerized method comprising: a Sentiment Analysis (SA) module. The SA module is: (i) retrieving one or more recordings of a video meeting from the database of video meeting recordings of each participant in the video meeting and associating the one or more recordings with a participant; (ii) dividing each retrieved recording into segments; (iii) processing the segments in a Facial Expression Recognition (FER) system to associate each segment with a timestamped sequence of expressions for each participant in the video meeting; and (iv) processing each segment in an Artificial Neural Network (ANN) having a dense layer, by applying a prebuilt and pretrained deep learning model, to yield a sentiment score for each statement for each participant.

12 Claims, 8 Drawing Sheets

| content | | | | |
|---|---|---|---|---|
| Associate1 | Normal — 410c | 2:32 | | |
| Associate1 | Sad — 420c | 7:48 | | |
| Associate1 | Happy — 430c | 12:39 | | Positive |
| Associate1 | Proud | 16:40 | | |
| Associate1 | Happy — 430c | 18:39 | | |
| Associate1 | Fulfilled | 19:10 | | |

In this pandemic time of Corona, this is the time to actually come together and fight against this deadly desease rather than pointing out the mistakes which humans have done in the past as this would set a very good example for future generations to understand it is fine to have differences in opinions but as humans we are equal and would fight against all such deseases with all unity and togetherness.

| Statement | Associates | Classifications |
|---|---|---|
| In this pandemic time of Corona, this is the time to actually come together and fight against this deadly disaease rather than pointing out the mistakes which humans have done in the past as this would set a very good example for future generations to understand it is time to have differences in opinions but as humans we are equal and would fight against all such diseases with all unity and togetherness | Associate1 | Normal, sad, happy, proud, happy, fulfilled |
| | Associate2 | Normal, happy, sad, happy, sad, happy, appreciate, disapproves, happy, proud |
| | Associate3 | Happy, sad, Normal, appreciates, agreement, happy, proud, fulfilled |
| | Associate4 | Sad, normal, happy, appreciates, angry, happy, confused |
| | Associate5 | Confused, normal, sad, confuse, happy, proud |
| | Associate6 | Normal |
| | Associate7 | Normal, sad, happy, happy, fulfilled |
| | Associate8 | Happy, confused, Normal, appreciates, agreement, happy, proud, fulfilled |
| | Associate9 | Normal |
| | Associate10 | Confused, normal, sad, confuse, happy, proud |

Figure 5C

| Input Statements | Predicted Output | Overall Sentiment |
|---|---|---|
| Normal, sad, happy, proud, happy, fulfilled | Positive | Positive |
| Normal, happy, sad, happy, sad, happy, appreciate, disapproves, happy, proud | Positive | |
| Happy, sad, Normal, appreciates, agreement, happy, proud, fulfilled | Negative | |
| Sad, normal, happy, appreciates, angry, happy, confused | Negative | |
| Confused, normal, sad, confuse, happy, proud | Negative | |
| Normal | Positive | |
| Normal, sad, happy, happy, fulfilled | Negative | |
| Happy, confused, Normal, appreciates, agreement, happy, proud, fulfilled | Positive | |
| Normal | Positive | |
| Confused, normal, sad, confuse, happy, proud | Positive | |

Figure 6

SENTIMENT ANALYSIS OF CONTENT USING EXPRESSION RECOGNITION

RELATED APPLICATIONS

This application claims priority as a continuation from application Ser. No. 16/907,247 dated Jun. 21, 2020, the disclosure of which is incorporated herein by reference.

TECHNICAL FIELD

The present disclosure relates to the field of systems and methods for evaluating a sentiment score of an interaction by capturing the reactions of the participants and processing it in an Artificial Neural Network (ANN) by applying data mining and machine learning models such as deep learning models.

BACKGROUND

Current systems are monitoring interactions between participants to produce indicators for various purposes, such as risk assessment and supervision and control, to handle suspicious risk events and to create accordingly, coaching plans, manage performance improvement and the like. One of the produced indicators out of the monitored interactions is sentiment score. However, current sentiment measurement solutions are based solely on the verbal aspect of the communication, such as selected keywords and audio analytics instead of other aspects of the communication such as facial and whole-body expressions. Facial and whole-body expressions are signals which may provide information how a participant has reacted at a certain point of time, during an interaction while listening to a statement or while speaking.

Hence, the verbal or audio-based methods might miss cues which may be received from facial or whole-body expressions of the participants during an interaction and may reveal the real sentiment. The significance of these cues is that it may aid in determining the genuine sentiment of the participants during a video conversation and later on enable appropriate actions to be taken upon the real sentiment to address concerns, such as confusion or dissatisfaction.

Furthermore, cues to determine the genuine sentiment of a participant might be helpful when emotions such as fear or nervousness are detected in a video meeting. These detected emotions might hint on an intent of a participant to conduct fraud. As mentioned above, also in this case, text analysis might not be helpful because the keywords in the text might seem nonsuspicious, but the intentions of the speaker which may be expressed by emotions such as fear or nervousness might be improper in the situation. For example, when a participant intends to commit a financial crime such as fraud.

Accordingly, there is a need for a system and method for providing a sentiment score by evaluating expressions of each participant during a video meeting or the sentiment score for the interaction as a whole for all participants. For example, in a contact center, there is a need to understand a listener's point of view, to calculate the overall sentiment of an interaction and to act accordingly.

In other words, there is a need for a technical solution that will analyze expressions during a video conversation and provide a time-based sentiment score as an output for various business scenarios.

SUMMARY

There is thus provided, in accordance with some embodiments of the present disclosure, a computerized method for providing a sentiment score by evaluating expressions of participants during a video meeting.

In accordance with some embodiments of the present disclosure, in a computerized system comprising a processor, a database of video meeting recordings; a memory to store the database, the processor may be configured to operate a Sentiment Analysis (SA) module.

Furthermore, in accordance with some embodiments of the present disclosure, the SA module may be configured to retrieve one or more recordings of a video meeting from the database of video meeting recordings of each participant in the video meeting and to associate the one or more recordings with a participant.

Furthermore, in accordance with some embodiments of the present disclosure, the SA may further divide each retrieved video recording into segments and then process the segments in a Facial Expression Recognition (FER) system to associate each segment with a timestamped sequence of expressions for each participant in the video meeting.

Furthermore, in accordance with some embodiments of the present disclosure, the SA may further process each segment in an Artificial Neural Network (ANN) having a dense layer, by applying a prebuilt and pretrained deep learning model, to yield a sentiment score for each statement for each participant.

Furthermore, in accordance with some embodiments of the present disclosure, the prebuilt deep learning model may include a building stage. The building stage may include: (i) receiving one or more timestamped sequences of expressions; (ii) tokenizing each timestamped sequence of expressions and then converting each tokenized timestamped sequence of expressions into a word vector; (iii) embedding the word vector into a matrix of a preconfigured size vectors; (iv) converting each expression in the word vector into an integer to yield a numerical vector; (v) padding the numerical vector into a preconfigured size; (vi) embedding the numerical vector into a matrix of vectors, wherein each vector in the matrix of vectors, represents a number in the numerical vector, and wherein for each number in the numerical vector assigning a preconfigured number of random weights to yield a matrix of a predefined size vectors; (vii) providing each vector of the embedded matrix to a deep learning system to yield a final vector in a preconfigure size; (viii) providing the final vector to the dense layer to receive one or more neurons which indicate a sentiment score for each statement for each participant; and (ix) converting each indicated sentiment score into '0' or '1' according to a predefined threshold.

Furthermore, in accordance with some embodiments of the present disclosure, the converting each indicated sentiment score into '0' or '1' according to a predefined threshold may be performed when there are two types of sentiment score classes such as positive and negative. There may be more than two types of classes of sentiment score. For example, 'Positive', 'Negative' and 'Neutral' which may be determined by the highest value of 'softmax' function that may be applied at the output layer for multiclassification, as such.

Furthermore, in accordance with some embodiments of the present disclosure, the dense layer may comprise one or more neural layers. Each neural layer may apply an activation function. The activation function may be a non-linear function.

Furthermore, in accordance with some embodiments of the present disclosure, a loss function and an optimizer to reduce the loss function to minimum by reducing an error between an actual value and a predicted value of the deep learning model may be applied on the dense layer.

Furthermore, in accordance with some embodiments of the present disclosure, a sentiment score of a statement for a participant in the video meeting may be calculated by: (i) retrieving the timestamped sequence of expressions for the participant that is associated with the statement, and (ii) attributing a preconfigured sentiment score for the timestamped sequence of expressions for the participant to yield the sentiment score of a statement for the participant.

Furthermore, in accordance with some embodiments of the present disclosure, a sentiment score of a statement for all participants in the video meeting may be calculated by: (i) adding the sentiment score of a statement for each participant to yield a total sentiment score for a statement, (ii) dividing the total sentiment score for a statement by a number of all the participants in the video meeting, to yield a score, and (iii) comparing the score with a predefined threshold to yield a final sentiment score for a statement for all participants.

Furthermore, in accordance with some embodiments of the present disclosure, an overall sentiment score of a video meeting may be calculated by: (i) adding the final sentiment score for a statement for all participants for each statement to yield a total sentiment score for all statements, (ii) dividing the total sentiment score for all statement by a number of all statements in the video meeting to yield a score, and (iii) comparing the score with a predefined threshold to yield an overall sentiment score for a video meeting.

Furthermore, in accordance with some embodiments of the present disclosure, a sentiment score of a participant in the video meeting may be calculated by: (i) adding the sentiment score of each statement in the video meeting to yield a total sentiment score, (ii) dividing the total sentiment score by a number of statements to yield a score, and (iii) comparing the score with a predefined threshold to yield a final sentiment score.

Furthermore, in accordance with some embodiments of the present disclosure, the deep learning system may be selected from: Recurrent Neural Network (RNN) system or Gated Recurrent Unit (GRU) system or Long Short-Term Memory (LSTM).

Furthermore, in accordance with some embodiments of the present disclosure, the embedding of the word vector may be performed by: (i) converting each expression in the word vector into an integer to yield a numerical vector; (ii) padding the numerical vector by generating random numbers to fill up the numerical vector of a preconfigured size and constantly updating these numbers, by using backpropagation into a preconfigured size; (iii) embedding the numerical vector into a matrix of vectors. Each vector in the matrix of vectors, represents a number in the numerical vector, and for each number in the numerical vector assigning a preconfigured number of random weights to yield a matrix of a predefined size vectors.

Furthermore, in accordance with some embodiments of the present disclosure, the FER system may be implemented in an open source computer vision and machine learning software library.

Furthermore, in accordance with some embodiments of the present disclosure, the open source computer vision and machine learning software library may be an Open Source Computer Vision (OpenCV) Library.

Furthermore, in accordance with some embodiments of the present disclosure, the activation function may be 'sigmoid' to yield a single neuron or 'softmax' to yield multiple neurons for more than two distinct sentiments.

Furthermore, in accordance with some embodiments of the present disclosure, the pretrained deep learning model may comprise a training stage comprising: (i) running the deep learning model with some proportionate values of batch size and epochs of video meeting recordings having an audio; (ii) converting the audio of the video meeting into one or more text statements; (iii) dividing each retrieved recording into segments; (iv) processing the segments in a Facial Expression Recognition (FER) system to associate every segment with a timestamped sequence of expressions; (v) associating each of the one or more text statements with a segment of the video meeting recording; (vi) processing each segment in a prebuilt deep learning model having a dense layer, to yield a sentiment score for each statement; and (vii) comparing the yielded sentiment score with a preconfigured sentiment score and adjusting weights of each neural layer of the ANN, accordingly.

BRIEF DESCRIPTION OF THE DRAWINGS

In order for the present disclosure to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "individuals", "associates" and "participants" are interchangeable.

The terms "predefined" and "preconfigured" are interchangeable.

As used herein, the term "expression" refers to a facial expression or to a whole-body language expression.

As used herein, the terms "word vector" or "thought vector" refer to a word's meaning as it relates to other words i.e., its context, with a single column of numbers. "word vector" or "though vector" represents a word in a vector format such that the vectors are related to each other similar to how the actual words are related to each other. For example, for the words 'friends' and 'amiable' the corresponding word vectors would be close in the spatial representation than the corresponding vector words of 'friends' and 'animosity', which would be far away from each other.

As used herein, the terms "loss function" or "cost function" refer to a function that maps an event or values of one or more variables onto a real number which represent some "cost" associated with the event.

As used herein, the term "Artificial Neural Network (ANN)" refers to computing systems which "learn" to perform tasks by considering examples, without being programmed with task-specific rules. It is used for complex problems, when programming is not feasible and especially for problems with very detailed and complexed patterns such as that faced in computer vision. Au ANN is based on a collection of connected nodes called neurons, which model the neurons in a biological brain. Each connection in the ANN can transmit a signal to other neurons. An artificial neuron that receives a signal, processes it and signals neurons connected to it. In ANN implementations, the "signal" at a connection is a real number, and the output of each neuron is computed by some non-linear function of the sum of its inputs, i.e., activation function. Neurons and edges have a weight that adjusts as learning proceeds and increases or decreases the strength of the signal at a connection. Neurons may have a threshold such that a signal is sent only if the aggregate signal crosses that threshold.

As used herein, the term "layer" refers to neurons which are aggregated into one or more layers in an ANN. Different layers may perform different transformations on their inputs. Signals travel from the first layer, i.e., the input layer, to the last layer i.e., the output layer, possibly after traversing the layers multiple times.

As used herein, the term "activation function" refers to a function that is added into an Artificial Neural Network (ANN) in order to help the network, learn complex patterns in the data. It takes in the output signal from the previous cell and converts it into some form that can be taken as input to the next cell. In order to make the model get the power also known as the higher degree complexity, to learn non-linear patterns, specific non-linear layers i.e., activation functions are added in between.

As used herein, the term "deep learning model" refers to a machine learning method based on ANN with representation learning. The neural networks are composed of one or more layers and each layer is made of nodes. In deep-learning networks, each layer of nodes trains on a distinct set of features based on the previous layer's output. The deeper into the neural network, the more complex the features that the nodes can recognize, since they aggregate and recombine features from the previous layer. Deep-learning networks are capable of handling very large, high-dimensional datasets with billions of parameters that pass through non-linear functions.

As used herein, the term "dense layer" refers to a layer in neural networks in which each input neuron is connected to the output neuron, like a simple neural network, the parameters units tell the dimensionality of the output.

Figure 1:
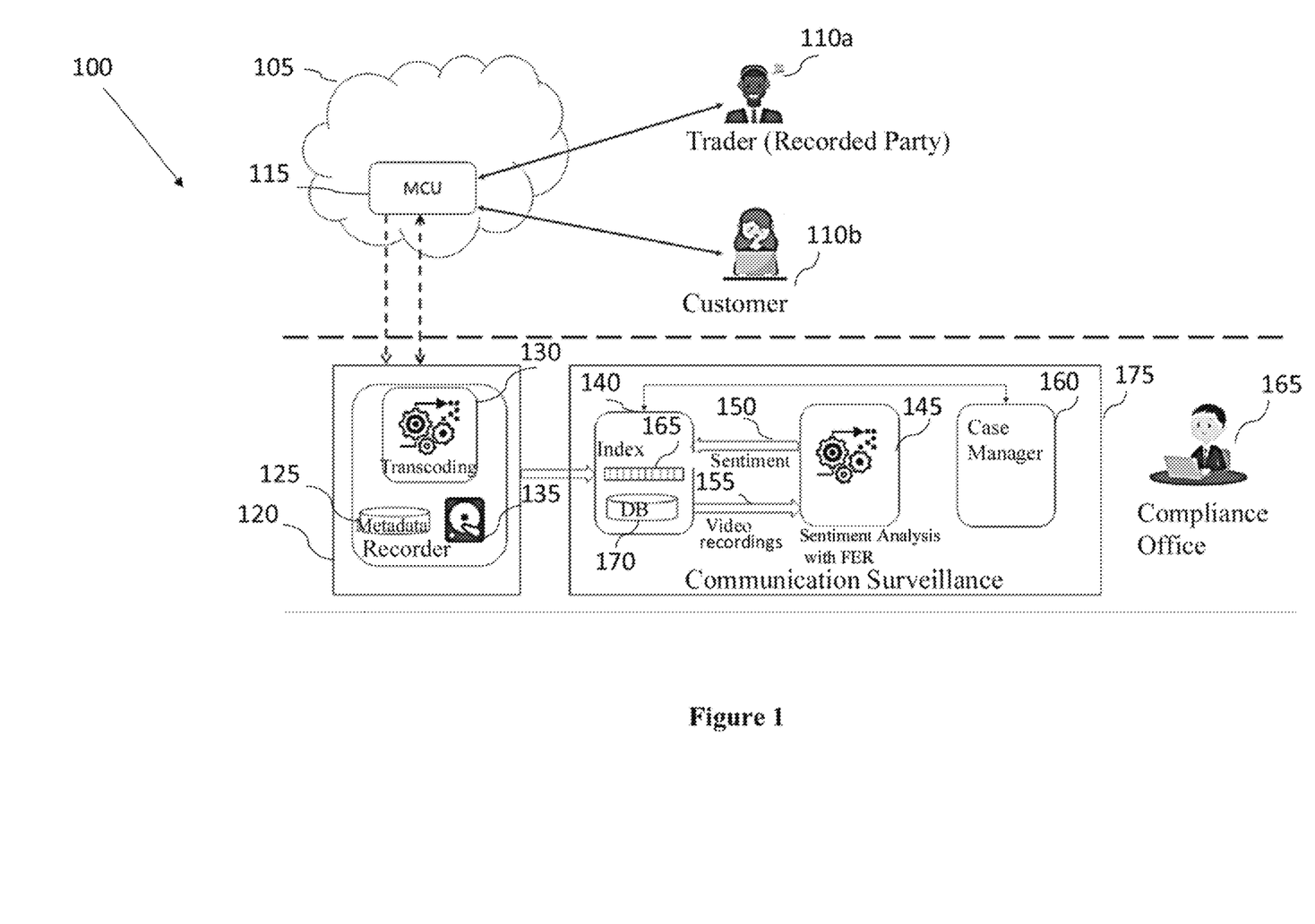
FIG. 1 schematically illustrates a high-level architecture to implement a computerized method to provide a sentiment score by evaluating expressions of participants during a video meeting, in accordance with some embodiments of the present disclosure.

FIG. 1 schematically illustrates a high-level architecture 100 to implement a computerized method to provide a sentiment score by evaluating expressions of participants during a video meeting, in accordance with some embodiments of the present disclosure.

According to some embodiments of the present disclosure, a unified communication and collaboration platform 105 may be implemented in a cloud computing environment, such as Microsoft Teams, that combines workplace chat, video meetings, file storage. The collaboration platform 105 may interact with a Multipoint Control Unit (MCU) unit 115 which may mix all the streams of a video meeting together and may send it to a recorder system such as recorder system 120.

According to some embodiments of the present disclosure, recorder system 120 may centrally manage all the organization's voice and video recordings of front-office, middle-office, back-office, including Mobile Phones, Cisco, Skype for Business, MS Teams and the like. It may further support dynamic recording, based on compliance policies of financial institutions. It may also incorporate the secure, automated capture and retention, instant retrieval, advanced search, and monitoring for all voice and video interactions.

According to some embodiments of the present disclosure, the recorder system 120 may comprise a metadata database 125, a transcoding component 130 and a datastore in which recordings i.e., audio/video files are stored 135. The transcoder 130 may perform transcoding of the video meetings code formats of the video meeting application into a code format of a data processing application and may store the metadata of the video recordings and audio files in the metadata database 125.

According to some embodiments of the present disclosure, the recorder system 120 may transfer the encoded video files and audio files and related metadata to a communication surveillance system such as communication surveillance system 175. Communication surveillance system 175 may comprise an index 165 for storing transcription of audio/video recordings and a database 170 to store metadata that may be required for communication surveillance 175 and sentiment analysis module, such as SA module 200 in FIG. 2.

Figure 2:
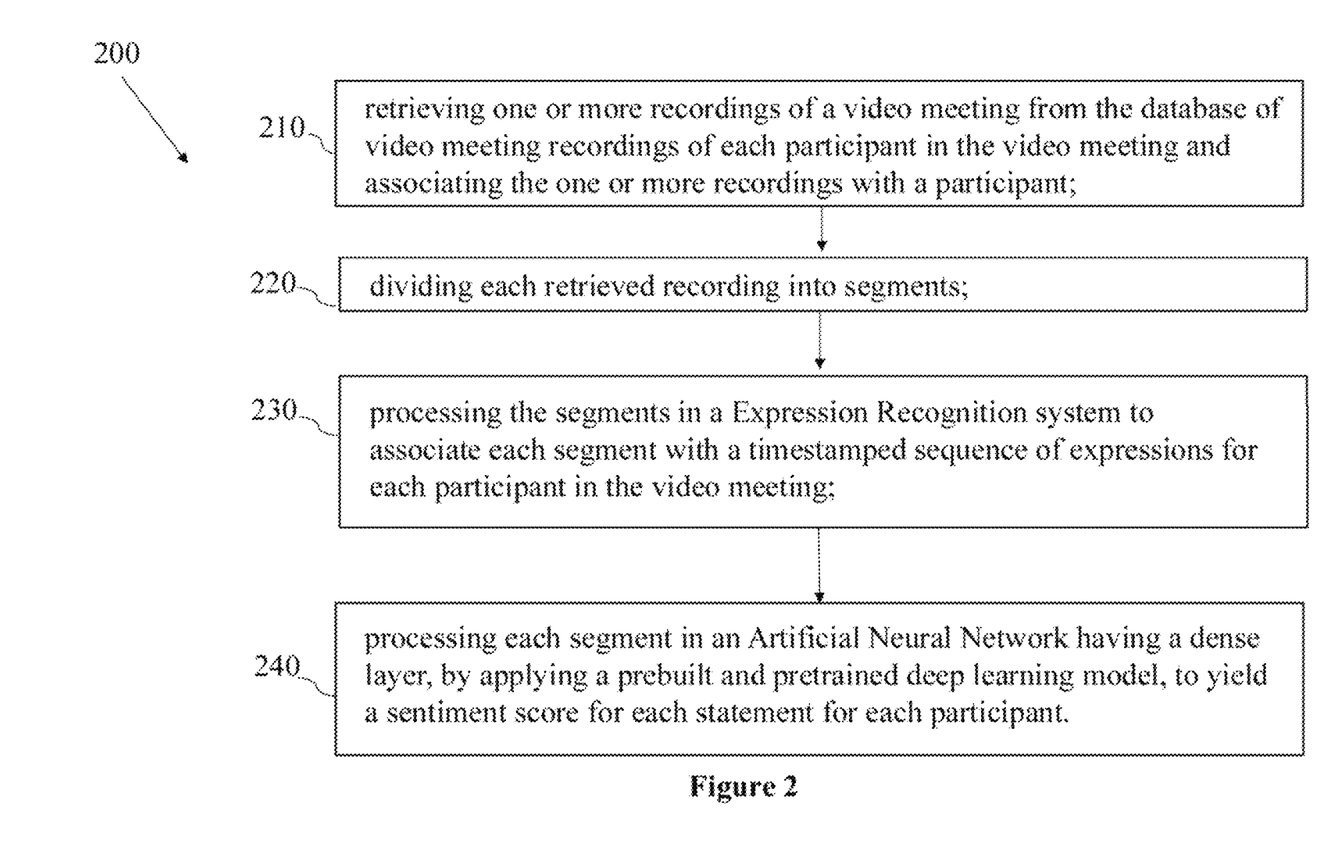
FIG. 2 schematically illustrates a high-level diagram of a computerized method for providing a sentiment score by evaluating expressions of participants during a video meeting, in accordance with some embodiments of the present disclosure.

According to some embodiments of the present disclosure, upon a request of a Sentiment Analysis (SA) module 145, such as SA module 200 in FIG. 2, the communication surveillance system 175 may send to the SA module 145, video recordings 155, to perform sentiment analysis also known as opinion mining or emotion AI, which is the use of video recording analysis, to systematically identify, extract, quantify, and study affective states and subjective information related to participants in the recorded video meeting, such as sentiment 150.

According to some embodiments of the present disclosure, the implementation of such a computerized method to provide a sentiment 150, e.g., a sentiment score, by evaluating expressions of participants during a video meeting, may be utilized by video communication analytics providers such as Amazon, Google, Microsoft and IBM.

According to some embodiments of the present disclosure, the SA module 145 may divide each retrieved video recording 155 into segments and then SA module 145 may process the segments in a an expression recognition system such as a Facial Expression Recognition (FER) system to associate each segment of the video recording 155 with a timestamped sequence of expressions, for each participant in the video meeting. Then, the SA module 145 may process each segment of the video recording 155 in a prebuilt and pretrained deep learning model having a dense layer, to yield a sentiment 150 e.g., sentiment score, for each statement in the video recording 155, for each participant of the recorded video meeting.

According to some embodiments of the present disclosure, the SA module 145 may send the sentiment, e.g., sentiment score 150, to the communication surveillance system 175 which may store it in a database 170. For the purpose of investigation management across the financial crime and compliance, a system such as case manager 160 may retrieve the sentiment score from database 170 upon a user request.

According to some embodiments of the present disclosure, a user, e.g., a compliance officer, in a compliance office 165 of a financial institution, may interact with case manager 160, to ensure that the organization is in compliance with its outside regulatory and legal requirements as well as internal policies and bylaws.

According to some embodiments of the present disclosure, to identify and manage regulatory risk, the compliance officer in the compliance office 165 may check the sentiment score of a statement during a video recording or the sentiment score of the video meeting as a whole, to identify an intention to commit a financial crime. For example, the compliance officer may detect fraud, by evaluating expressions of emotions such as fear or nervousness of a participant during the recorded video meeting. Correspondingly, the sentiment score provided by SA 145, such as SA module 200 in FIG. 2, may enable analysts and investigators, such as the compliance officer in the compliance office 165, to reduce investigation time, while improving decision making, e.g., risk analysis.

According to some embodiments of the present disclosure, such risk analysis for financial institutions, that is based on the sentiment score provided by SA 145, such as SA module 200 in FIG. 2, may detect fraud that risk analysis based on text analysis might not detect, because the text might seem non-suspicious, but the evaluated intentions of the participant based on the participant expressions, might be determined as improper for the situation and accordingly the participant may be suspected as intending to conduct a financial crime, e.g., fraud.

FIG. 2 schematically illustrates a high-level diagram of a computerized method for providing a sentiment score by evaluating expressions of participants during a video meeting implemented by SA module 200, in accordance with some embodiments of the present disclosure.

According to some embodiments of the present disclosure, operation 210 may comprise retrieving one or more recordings of a video meeting from the database of video meeting recordings of each participant in the video meeting and associating the one or more recordings with a participant.

According to some embodiments of the present disclosure, operation 220 may comprise dividing each retrieved recording into segments.

According to some embodiments of the present disclosure, operation 230 may comprise processing the segments in an expression recognition system, such as a Facial Expression Recognition (FER) system, to associate each segment with a timestamped sequence of expressions for each participant in the video meeting.

According to some embodiments of the present disclosure, the FER system may be implemented in an open source computer vision and machine learning software library. The open source computer vision and machine learning software library may be an Open Source Computer Vision (OpenCV) Library.

According to some embodiments of the present disclosure, operation 240 may comprise processing each segment in an Artificial Neural Network (ANN) having a dense layer, by applying a prebuilt and pretrained deep learning model, to yield a sentiment score for each statement for each participant.

According to some embodiments of the present disclosure, the dense layer comprising one or more neural layers, each neural layer is applying an activation function. The activation function may be 'sigmoid' to yield a single neuron or 'softmax' to yield multiple neurons for more than two distinct sentiments.

According to some embodiments of the present disclosure, the deep learning system is selected from: a Recurrent Neural Network (RNN) system or Gated Recurrent Unit (GRU) system or Long Short Term Memory (LSTM).

Recurrent Neural Networks (RNN) are networks which process information. They are commonly used for sequence related tasks like Speech Recognition, Music Generation, Expression Recognition, etc. However, RNN's "suffers" from short-term memory called the Vanishing Gradient Problem. Meaning, if a sequence is long enough, RNN will have a hard time carrying the information from the earlier timesteps to later ones. Gated Recurrent Unit (GRU) and Long Short-Term Memory (LSTM) Networks, solve this issue.

LSTM is an artificial recurrent neural network (RNN) architecture used in the field of deep learning. Bidirectional LSTMs are an extension of traditional LSTMs that can improve the deep learning model performance on sequence classification problems.

According to some embodiments of the present disclosure, a loss function and an optimizer to reduce the loss function to minimum by reducing an error between an actual value and a predicted value of the deep learning model are applied on the dense layer.

Figure 3:
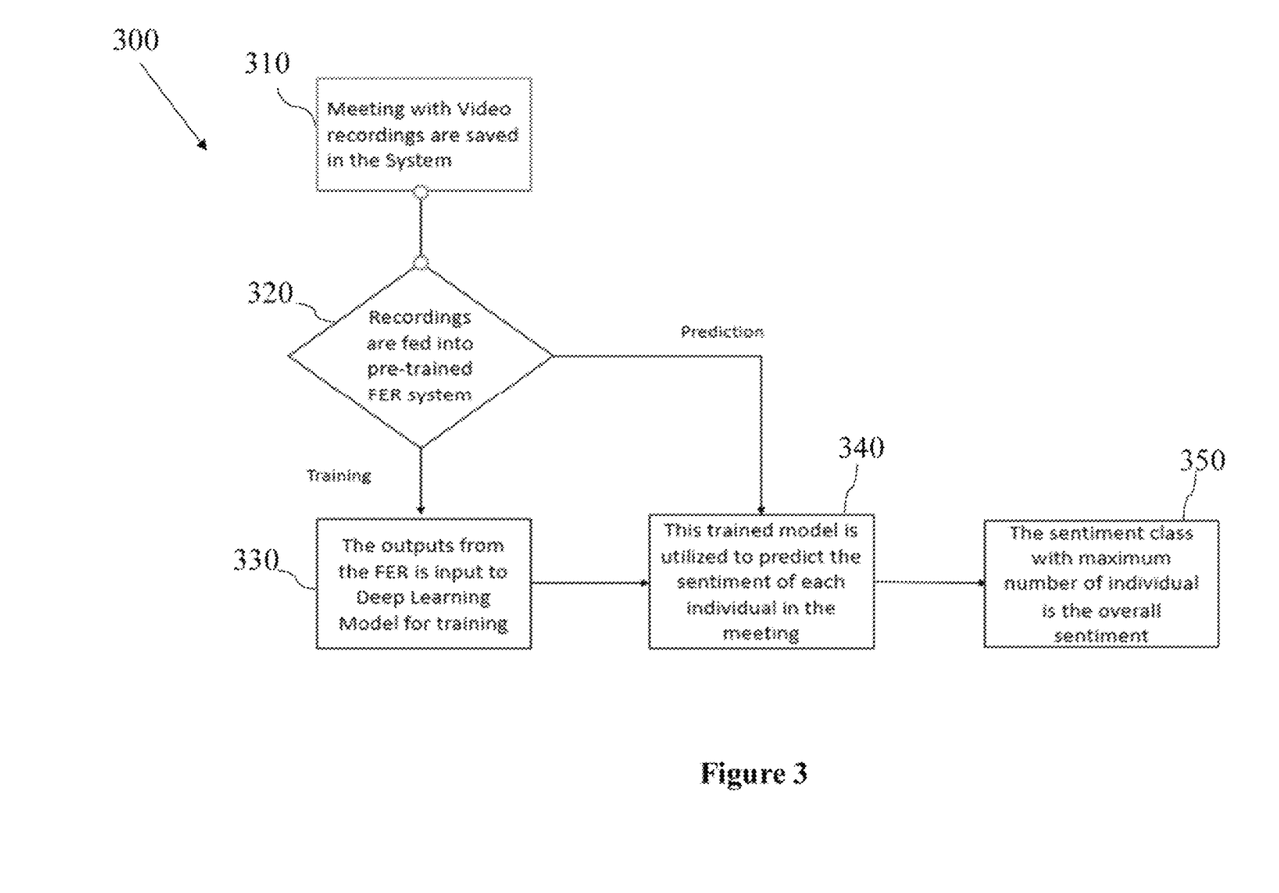
FIG. 3 schematically illustrates a high-level diagram of a computerized-method for training a model for predicting overall sentiment of a video meeting, in accordance with some embodiments of the present disclosure.

FIG. 3 schematically illustrates a high-level diagram of a computerized-method 300 for training a model for predicting overall sentiment of a video meeting, in accordance with some embodiments of the present disclosure:

According to some embodiments of the present disclosure, operation 310 may comprise saving video recordings of meetings in a recorder system, such as recorder system 120 in FIG. 1. The input to a deep learning model for predicting overall sentiment of a video meeting are video recordings which are captured during a video meeting. These video recordings may be from any available resources or applications which have the capability of enabling the video recording while having a conference or video meeting. These meetings may be recorded as part of a surveillance operation of the system, in organizations such as financial institutions. Accordingly, the recorder system, such as recorder system 120, may send the video recordings to a communication surveillance system such as communication surveillance system 175 in FIG. 1.

According to some embodiments of the present disclosure, operation 320 may comprise feeding the video recordings into a pre-trained FER system for either later on sentiment score prediction or for training purposes. The video recordings may be pushed through an expression recognition system e.g., FER system, which has been trained for customized use of the organization.

According to some embodiments of the present disclosure, a user that is operating the computerized method 300 for training a model for predicting overall sentiment of a video meeting, may configure the FER system to identify different numbers of expressions. The video recordings may be passed in the FER system which may capture expressions of each participant for the entire length of the conversation. The output of the FER system may be a timestamped sequence of facial expressions for each participant or a timestamped sequence of whole-body expressions.

According to some embodiments of the present disclosure, operation 330 may comprise taking the output of FER system and input it into deep learning model for training purposes. The data structure for the input may be an array data array structure.

The expressions e.g., timestamped sequence of facial expressions which were captured by the FER system, may be tokenized and then may be converted to word vectors and fed into a Recurrent Neural Network (RNN) or any of the variations of RNN, which then entered into a dense layer and an output layer that is equal to the number of classes of sentiments that the deep learning model has been configured to predict.

According to some embodiments of the present disclosure, the output layer may be the final layer of the neural artificial network, which may have the same number of neurons as the preconfigured number of classes to predict and may have an activation function applied on it. The activation function may be 'sigmoid' if there are two classes to predict and would be 'Softmax' if there are more than two classes to predict, when the configured sentiments of the output layer is positive and negative.

According to some embodiments of the present disclosure, the number of classes of sentiment may be higher than two, for example it may be 'positive', 'negative' and 'neutral' as mentioned above.

According to some embodiments of the present disclosure, operation 340 may comprise having the trained model being utilized to predict the sentiment of each individual, i.e., participant, in the video meeting. The prebuilt model may be trained and used for prediction of a sentiment score, where the input required for prediction may be a time-stamped sequence of facial expressions for each participant in the video meeting which may be generated from the expression recognition system for all the segments of the video recording. The prediction may provide a sentiment score of how each participant in the video meeting feels about each statement in the meeting and also may provide a sentiment score about the entire recorded meeting for each participant and for all participants.

According to some embodiments of the present disclosure, a sentiment score of a participant in the video meeting may be calculated by adding the sentiment score of each statement in the video meeting to yield a total sentiment score, and then the total sentiment score may be divided by a number of statements to yield a score, and then the score may be compared with a predefined threshold to yield a final sentiment score.

According to some embodiments of the present disclosure, operation 350 may comprise determining the overall sentiment score based on the sentiment class that has been associated to the maximum number of individuals. An overall sentiment score of a video meeting may be calculated by adding the final sentiment score for a statement for all participants for each statement to yield a total sentiment score for all statements, the total sentiment score for all statements may be divided by the number of all statements in the video meeting to yield a score, and the score may be compared with a predefined threshold to yield an overall sentiment score for the video meeting.

According to some embodiments of the present disclosure, when the classes of sentiment score are, for example, positive and negative i.e., '0', '1' the sentiment score of all statements may be added and then divided by the total number of statements to find out the sentiment for the video meeting.

Figure 4A:
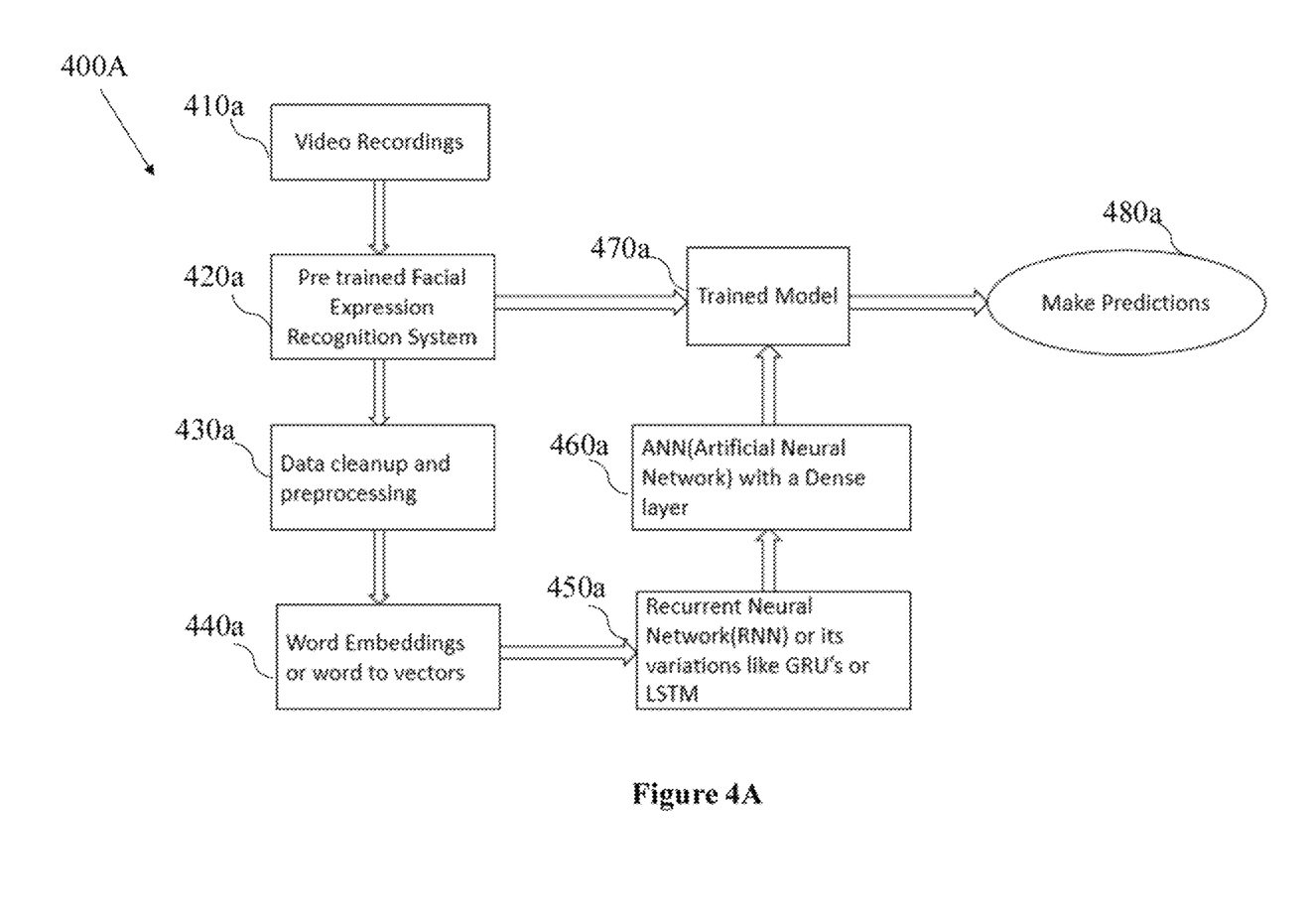
FIG. 4A schematically illustrates a high-level diagram of a computerized method for building and training a model for predicting overall sentiment of a video meeting, in accordance with some embodiments of the present disclosure.

FIG. 4A schematically illustrates a high-level diagram of a computerized system 400A for building and training a model for predicting overall sentiment of a video meeting, in accordance with some embodiments of the present disclosure.

According to some embodiments of the present disclosure, operation 410a may comprise retrieving video recordings from a database such as database 170 in FIG. 1, where the video recordings of each video meeting may be stored. This database may also have data which would be further modified for training the deep learning model and also the data which would be used as an input to predict a sentiment of a participant in a video meeting or an overall sentiment of the video meeting.

According to some embodiments of the present disclosure, operation 420a may comprise processing the segments of the video recording in an expression recognition system such as a pre-trained Facial Expression Recognition (FER)

system to associate each segment with a timestamped sequence of facial expressions for each participant in the video meeting. The pre-trained FER system may capture the real time expressions of the participants in the video meeting. The real time expressions of the participants may be facial expressions or whole-body expressions.

According to some embodiments of the present disclosure, the pre-trained FER system may have the capability to capture various expressions which an end-user may determine that it is sufficient for predicting the overall sentiment score of the interaction. Commonly, the higher the number of classes is for the overall sentiment, the higher should be the number of expressions which may be captured by the FER system. As higher the number of expressions which an expression recognition system such as FER system may be configured to capture, the higher the nuances that it may capture, which ultimately may aid in predicting the overall sentiment score.

Figure 4B:
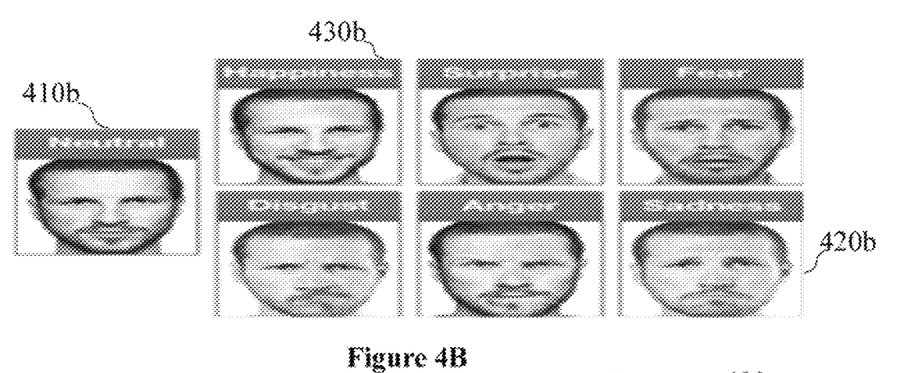
FIG. 4B illustrates a sequence of expressions received from an expression system, in accordance with some embodiments of the present disclosure.

According to some embodiments of the present disclosure, operation 430a may comprise data cleanup and pre-processing. The preparation of data is an important aspect of the computerized method for providing a sentiment score by evaluating expressions of participants during a video meeting and it may include input labels and output labels. FIG. 4B illustrates a sequence of expressions received from an expression system, in accordance with some embodiments of the present disclosure. The input labels may be a series of expressions, such as the sequence of facial expressions for each participant, as shown in FIG. 4B that is generated from the FER system. The sequence of facial expressions for each participant may include expressions such as neutral 410b, sadness 420b and happiness 430b, as shown in FIG. 4B.

Figure 4C:
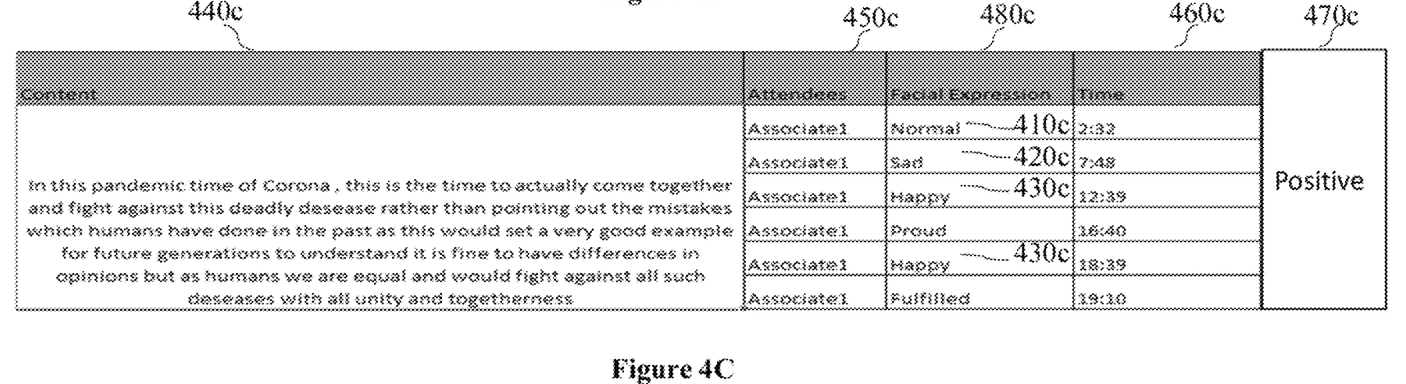
FIG. 4C illustrates a format of an input to a deep learning model, in accordance with some embodiments of the present disclosure.

FIG. 4C illustrates a format of an input to a deep learning model, in accordance with some embodiments of the present disclosure. According to some embodiments of the present disclosure, the output labels may be the real sentiment such as sentiment score 470c that may be attributed manually for each statement 440c, to yield for a participant, such as 'associate1' 450c, a timestamped 460c sequence of expressions 480c that is associated with the attributed sentiment score 470c. These output and input labels may act as a guiding stick for the deep learning model and after training the deep learning model may predict accordingly.

According to some embodiments of the present disclosure, operation 440a may comprise word embedding or word to vectors. Deep learning models may operate with numbers only, hence there is a need to convert the sequence of expressions for each participant, to numbers or vectors which may be input to the deep learning model.

According to some embodiments of the present disclosure, to convert these expressions 480c in FIG. 4C into vectors, a process of word embeddings may be utilized. Before the training of the deep learning model starts, random numbers may be generated to fill up the vectors of according to a preconfigured size and at the time of training of the deep learning model these numbers may be updated constantly using back propagation which results in creating the vectors in such a way that at the end of the pipeline the cost function i.e., loss function may be reduced to minimum.

According to some embodiments of the present disclosure, the embedding of the word vector may be performed by (i) converting each expression in the word vector into an integer to yield a numerical vector; (ii) padding the numerical vector by generating random numbers to fill up the numerical vector of a preconfigured size and constantly updating these numbers, by using backpropagation into a preconfigured size; and (iii) embedding the numerical vector into a matrix of vectors. Each vector in the matrix of vectors, may represent a number in the numerical vector, and for each number in the numerical vector a preconfigured number of random weights may be assigned to yield a matrix of a predefined size vectors.

According to some embodiments of the present disclosure, operation 450a may comprise operating Recurrent Neural Network (RNN) or it's variants like GRU's or LSTM. RNN's are designed specifically to take the input data in the timestep format, where the input data is entered in the RNN system one by one at every timestep. The output from the first timestep may be combined with the input from the next timestep to yield a single length vector as an output. This vector is a representation of the entire sequence in numbers, which is also known as thought vector.

According to some embodiments of the present disclosure, operation 460a may comprise using Artificial Neural Network (ANN) with a dense layer.

According to some embodiments of the present disclosure, the vectors which were obtained from the RNN network or a variant thereof may be converted into single-dimension vector which may be converted to a neural layer. The neural layer may be connected to multiple neural layers before the output layer with compatible activation function.

According to some embodiments of the present disclosure, a loss function and an optimizer may be applied on the dense layer to reduce the cost function i.e. the error between the actual and the predicted values of the model, to its minimum.

According to some embodiments of the present disclosure, operation 470a may comprise receiving the output of operation 420a which is a sequence of expressions as shown in FIG. 4B for training purposes or alternatively receiving the output of operation 460a which is the output of the Artificial Neural Network (ANN) with the dense layer.

According to some embodiments of the present disclosure, operation 480a may comprise making predictions, e.g., providing a sentiment score according to the evaluated expressions of the participants during the recorded video meeting.

Figure 5A:
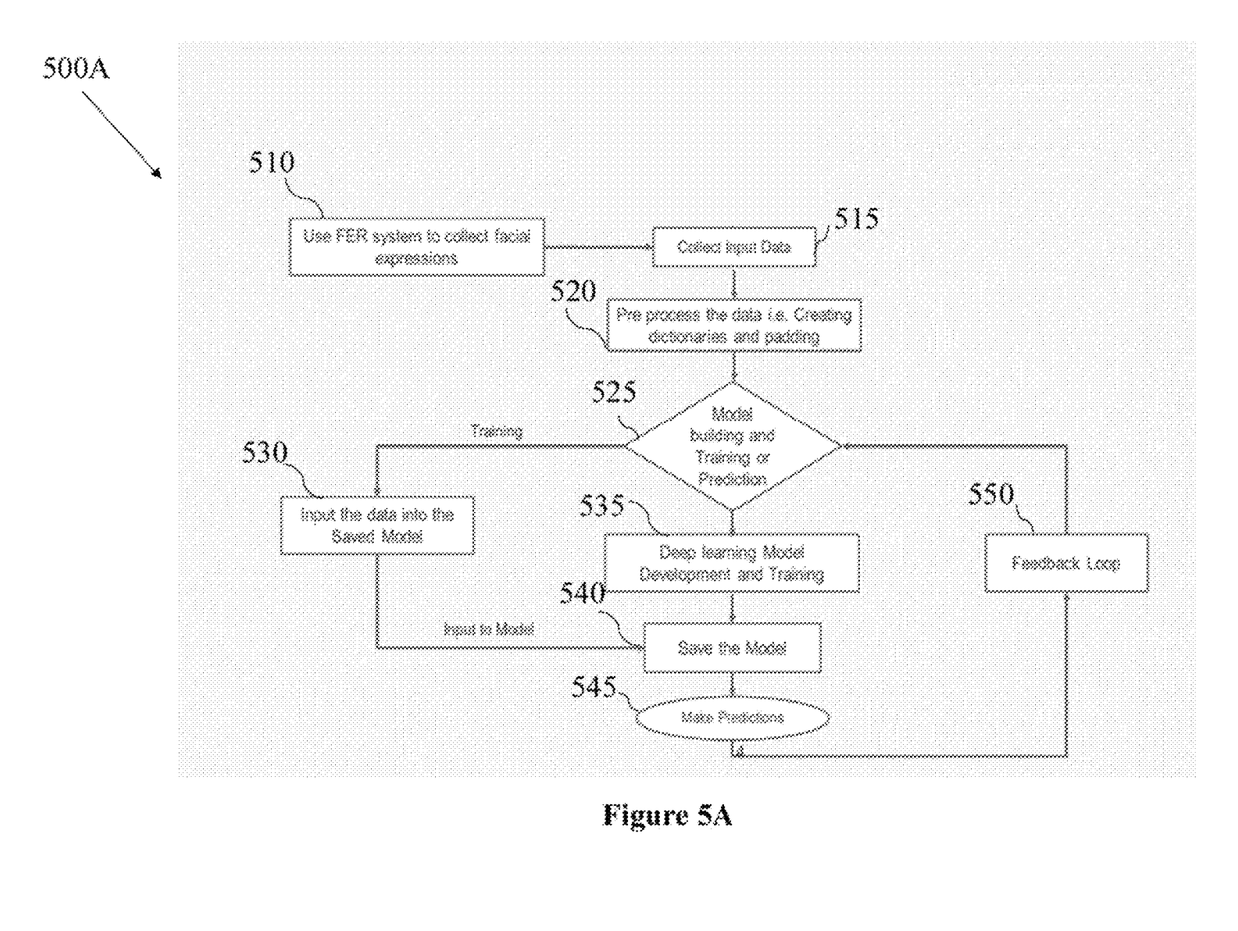
FIG. 5A schematically illustrates a high-level diagram of a computerized system for building and training a model for predicting overall sentiment of a video meeting and usage thereof, in accordance with some embodiments of the present disclosure.

FIG. 5A schematically illustrates a high-level diagram of a computerized system 500A for building and training a model for predicting overall sentiment of a video meeting and usage thereof, in accordance with some embodiments of the present disclosure.

According to some embodiments of the present disclosure, an expression recognition system such as a pretrained FER system may be used to collect expressions such as facial expressions or whole-body expressions 510. The pretrained FER system may receive a video recording as au input to yield a series of expressions for each participant throughout the video. The expressions may be tokenized to be later on entered to a deep learning system such as RNN system.

According to some embodiments of the present disclosure, The FER system should be capable of generating a sufficient number of expressions for an accurate sentiment prediction.

According to some embodiments of the present disclosure, input data may be collected 515 for each participant during a video recorded or a live meeting. Each recorded video of a participant i.e., an associate may be passed through the FER system that may tag an expression at each point of time, e.g., timestep for each participant.

According to some embodiments of the present disclosure, an operation of preprocess of data may be performed 520. Since the tokens which were generated by the FER system cannot be directly ingested into the deep learning model, a preprocess of data which includes dictionaries and padding may be operated. The data from the FER system may be a timestamped sequence of expressions.

According to some embodiments of the present disclosure, since this is a supervised deep learning model, there is a need to have the actual result, which may be a benchmark, to provide the model to learn from. Therefore, as shown in FIG. 4C a sentiment score 470c may be attributed manually for each statement 440c to yield for a participant such as 'associate1' 450c, a timestamped 460c sequence of expressions 480c that is associated with the attributed sentiment score 470c.

Figure 5B:
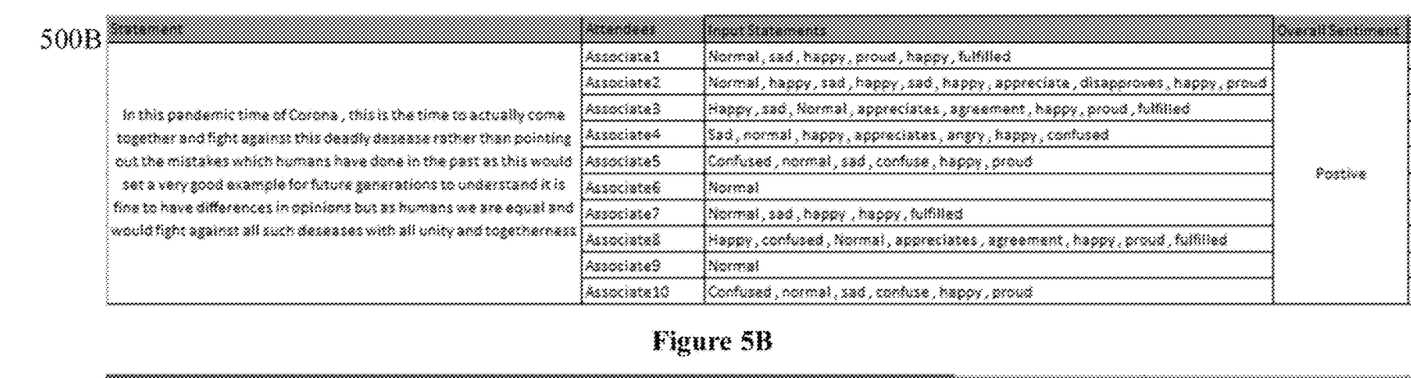
FIG. 5B schematically illustrates a sentiment score for all participants for a statement in a video recorded meeting, in accordance with some embodiments of the present disclosure.

FIG. 5B schematically illustrates a sentiment score for all participants for a statement in a video recorded meeting, in accordance with some embodiments of the present disclosure. According to some embodiments of the present disclosure, the timestamped sequence of expressions of all participants for a statement may be merged into one dataset such as dataset 500B in FIG. 5B.

Figure 5C:
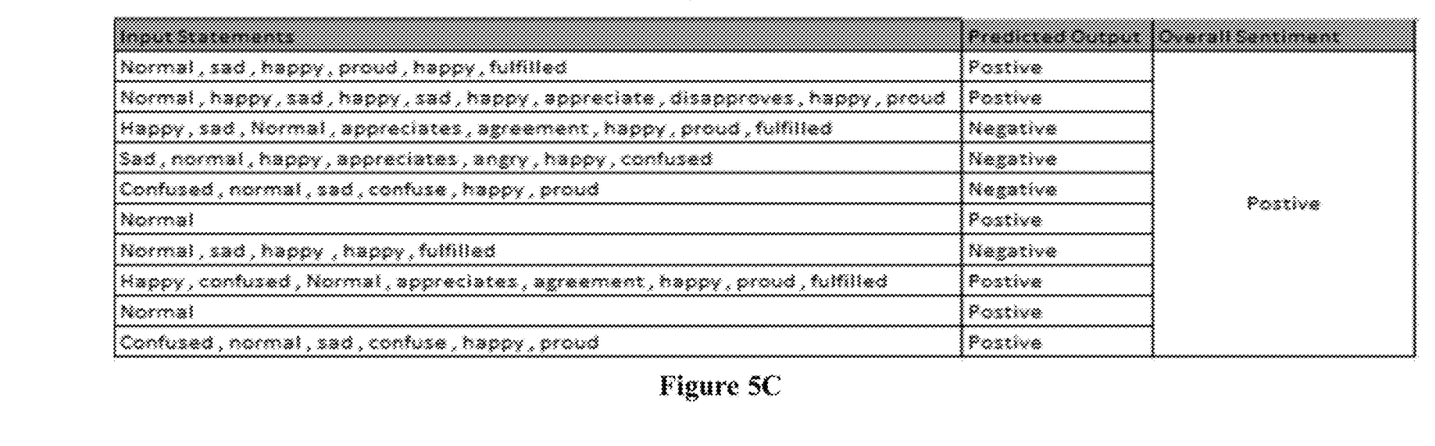
FIG. 5C schematically illustrates a sentiment score for all participants for the entire video recorded meeting, in accordance with some embodiments of the present disclosure.

FIG. 5C schematically illustrates a sentiment score for all participants for the entire video recorded meeting, in accordance with some embodiments of the present disclosure. An 'Overall sentiment' may be the overall sentiment of the video which has been obtained, by counting the number of 'Positive', 'Negative' or 'Neutral' sentiments in a 'Predicted output' dataset. For example, in a 'Predicted Output' dataset, there may be six 'Positive' sentiments and four 'Negative' sentiments, hence the overall sentiment of the video may be determined to be 'Positive' in the 'Overall Sentiment', as shown in FIG. 5C.

According to some embodiments of the present disclosure, a dictionary data structure may be used to store all the tokens of expressions, which may be created and an integer may be assigned to all distinct expressions that have been captured by the FER system. For example, Expression dictionary {
  1: normal
  2: sad
  3: happy
  4: proud
  5: fulfilled
  6: appreciate
  7: disapproves
  8: agreement
  9: angry
  10: confused
}

Accordingly, a sequence may be created with the numbers in the created Expression dictionary. The tokens may be replaced with these numbers, so for example if the sequence of expressions in tokens is: "Normal, sad, happy, proud, happy, fulfilled" then, the sequence may be converted to "1, 2, 3, 4, 3, 5" which indicate the tokens in the Expression dictionary.

According to some embodiments of the present disclosure, a padding sequence may be performed because not all the sequences have the same length i.e. the example for sequence such as "1, 2, 3, 4, 3, 5" the length is 6, but there may be sequences which may be longer or shorter, hence a maximum length may be determined out of the training data and then sequences may be padded for a uniform length of maximum length. For example: if the maximum length has been found out to be 10 then to the following sequence "1, 2, 3, 4, 3, 5", four zeros may be added at the end to make the sequence of uniform length. Accordingly, the padded sequence may be: 1,2,3,4,3,5,0,0,0,0.

According to some embodiments of the present disclosure, the processed data may be entered to the model building and training or prediction 525. In the training stage the input data may be entered to a saved model 530 and later on the model may be saved 540.

According to some embodiments of the present disclosure, in building stage, the result of operation 525 may be entered to deep learning model development and training stage and later on may be saved in operation 540. The model building is described in detail in FIG. 6.

According to some embodiments of the present disclosure, after the model has been saved in operation 540 it may be used for sentiment predictions 545 and may provide a feedback 550 which may be entered to operation 525 of model building and training.

Figure 6:
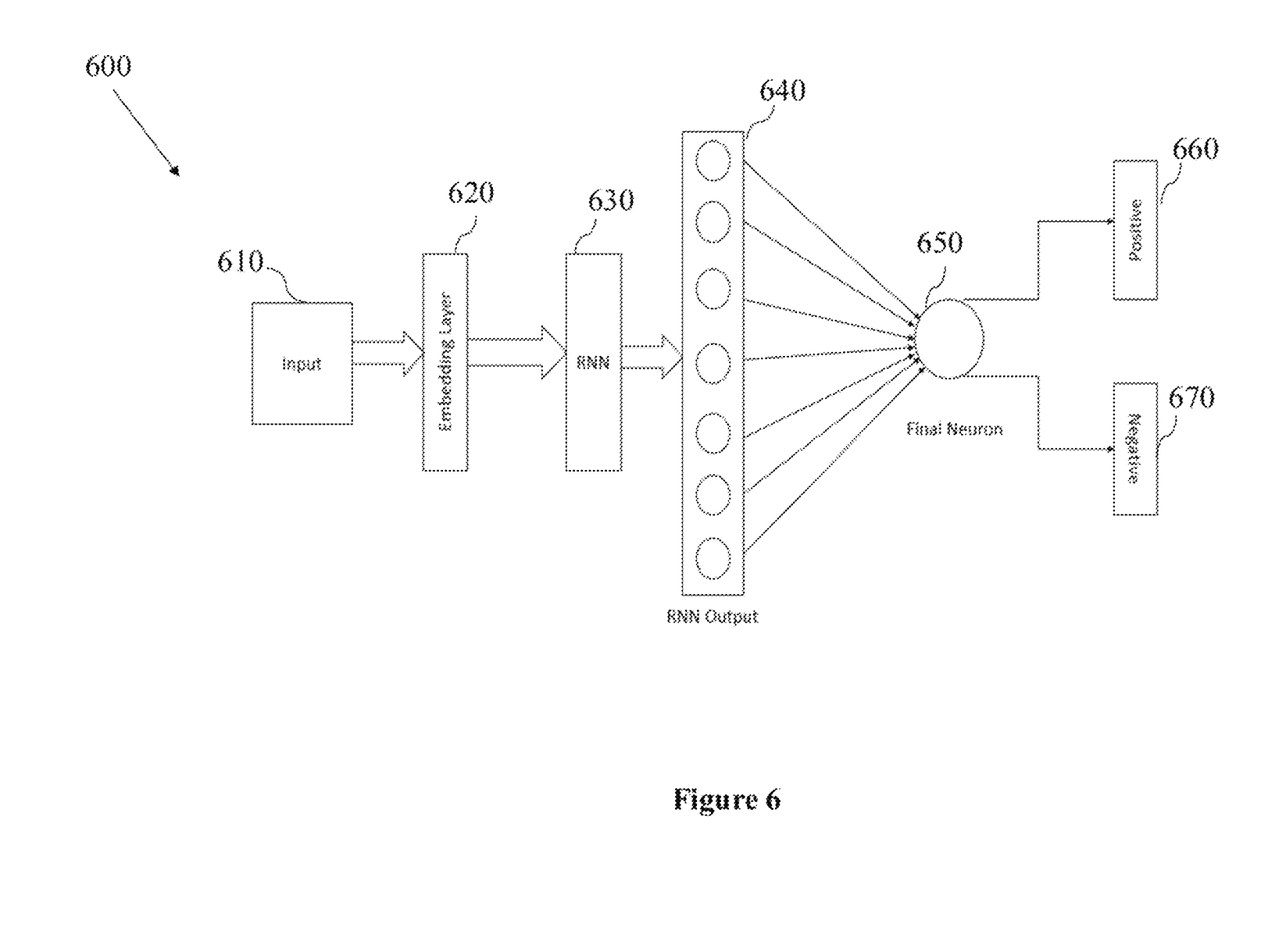
FIG. 6 schematically illustrates a high-level diagram of model building, in a contact center, in accordance with some embodiments of the present disclosure.

FIG. 6 schematically illustrates a high-level diagram of model building, in a contact center, in accordance with some embodiments of the present disclosure.

According to some embodiments of the present disclosure, the converted expressions, for example, "1,2,3,4,3,5,0,0,0,0" may be attributed a sentiments score which may be mapped as follows: 'Positive' Sentiment to 0 and 'Negative' Sentiment to 1 to form the input 610.

According to some embodiments of the present disclosure, the embedding layer 620 may convert the integers for example, "1,2,3,4,3,5,0,0,0,0" into vectors which at the time of backpropagation may adjust its weights in such a way that those vectors would behave in such a way that would be very similar to the actual expressions. For example, the vectors replacing the integers 2 & 7 i.e., 'sad' and 'disapproves', would be very close to each other in their dimension, property of word to vectors. For example, Input to Embedding layer is: [1,2,3,4,3,5,0,0,0,0]
Output of the Embedding layer is:
array([[[−0.1016112,    −0.01847062,    0.03185738, −0.00973114, 0.02777765], [−0.03645129, −0.02272549, 0.0292186, −0.03176935, 0.04851304], [0.02611823, 0.01197814, −0.02375468, −0.010735, 0.03446602], [−0.0312557, −0.04828325, −0.03187968, 0.4534221, −0.00636505], [0.02611823, 0.01197814, −0.02375468, −0.010735, 0.03446602], [−0.01807895, −0.04657009, 0.00846279, −0.03393265, −0.03502371], [−0.00695772, 0.01860242, 0.04709167, 0.00689103, −0.03091734], [−0.00695772, 0.01860242, 0.04709167, 0.00689103, −0.03091734], [−0.00695772, 0.01860242, 0.04709167, 0.00689103, −0.03091734], [−0.00695772, 0.01860242, 0.04709167, 0.00689103, −0.03091734]]], dtype=float32)

According to some embodiments of the present disclosure, the vectors generated from the embedding matrix may go into RNN system 630 one by one and then a final vector may be produced. RNN is responsible for generating the output which has captured the entire context of the input. Thus, each vector would go into the RNN system 630 and then the final output would be produced. For example, Input for RNN: the output of embedded layer 620.
Output for RNN: 640
array([[0.01993058,    0.00782396,    0.00045052, −0.00196583, 0.00286143, 0.01229991, 0.00208943, −0.00508016, 0.0050265, −0.0041855, 0.0025211, 0.00256539, −0.00264452, 0.01060891, 0.00364115, 0.00840204, 0.00163176, −0.00938375, −0.00361455, −0.00787686, −0.01162232, 0.00459066, 0.00692395, 0.00458044, 0.00656285, 0.00614192, −0.00419773, 0.00332861, 0.00297817, −0.00198607]], dtype=float32)

According to some embodiments of the present disclosure, the final neuron 650 may be generated from the output of the RNN system 640. The final neuron may be a simple neural layer 650 with only one neuron, which produces a single value which is then compared to a threshold to mark it as '0' or '1'. For example, when the output of RNN layer 640 is the input of final neuron 650 it may result for example:

array([[0.50007135]]

According to some embodiments of the present disclosure, to make a prediction according to the final neuron result 650 a threshold should be configured. For example, the threshold may be configured to be 0.5, so whenever the prediction value comes out to be greater than 0.5 it would be marked as '1' or otherwise as '0'.

RNN's are the special kind of Neural Network which have the capability of taking the inputs at every timestep and feedback the output from the previous timestep to the next timestep, by this they have the capability of combining the entire sentence together to form a vector which can be utilized as an input to the Artificial Neural Network.

According to some embodiments of the present disclosure, an RNN system may be unrolled (or unfolded) into a full network. By unrolling the output from the network for the complete sequence may be shown. For example, if the sequence is of 10 words, the network would be unrolled into a 10-layer neural network, one layer for each word. The formulas that are involved in the computation happening in an RNN are as follows:

$x_t$ is the input at time step 1. For example, $x_1$ could be word embedding corresponding to the second word of a sentence.

$s_t$ is the hidden state at time step 1. It's the "memory" of the network. $s_t$ is calculated based on the previous hidden state and the input at the current step:

$$s_t = f(Ux_t + Ws_{t-1}).$$

The function $f$ usually is a nonlinearity such as sigmoid, tan h or ReLU. $s_{-1}$, which is required to calculate the first hidden state, is typically initialized to all zeroes.

$o_t$ is the output at step t. For example, if we wanted to predict the overall sentiment of a sentence it would be a vector of probabilities across our sentiment class.

$$o_t = \text{softmax}(Vs_t).$$

The hidden state $s_t$ may be regarded as the memory of the network. $s_t$ captures information about what happened in all the previous time steps. The output at step $o_t$ is calculated solely based on the memory at time t. Unlike a traditional deep neural network, which uses different parameters at each layer, an RNN system shares the same parameters (U.V.W above) across all steps. This reflects the fact that the same task is performed at each step, just with different inputs. This greatly reduces the total number of parameters that it needs to learn. The main feature of an RNN is its hidden state, which captures some information about a sequence.

According to some embodiments of the present disclosure, to show the improvement of the present disclosure, i.e. SA module 200 in FIG. 2, the same dataset for a deep learning model has been utilized for the current way of evaluating a sentiment score and the present disclosure.

No change in hyperparameter and training dataset. The validation dataset is of same percentage throughout The loss function and the optimizer are also the same. The epochs and batch size are of same percentage in both models.

For example,
Variables:
sent_length=10
sample=30000
sample_train=24000
word_corpus=1000
associate=5
no_of_exp=4
Simple model for Sentiment Analysis:
base_model=models.Sequential( )
base_model.add(layers.Dense(30, activation='relu', input_shape=(10,)))
base_model.add(layers.Dense(30, activation='relu'))
base_model.add(layers.Dense(1, activation='sigmoid'))
base_model.summary( )
Model: "sequential_1"

| Layer (type) | Output Shape | Param # |
|---|---|---|
| Dense_1 (Dense) | (None, 30) | 330 |
| Dense_2 (Dense) | (None, 30) | 930 |
| Dense_3 (Dense) | (None, 1) | 31 |

Total params: 1,291
Trainable params: 1,291
Non-trainable params: 0

The Model execution details is given below:

```
base_model.compile(optimizer='adam' , loss='binary_crossentropy' , metrics=['accuracy'])
base_model.fit(np.array(sent_corpus[:sample_train]),np.array(out_corpus[:sample_train]),epochs
=25,batch_size=500,validation_split=0.1)
```

Confusion Matrix with this Model:

[[1502 1540]
[1471 1487]]

| | precision | recall | f1-score | support |
|---|---|---|---|---|
| 0 | 0.51 | 0.49 | 0.50 | 3042 |
| 1 | 0.49 | 0.50 | 0.50 | 2958 |
| accuracy | | | 0.50 | 6000 |
| macro avg | 0.50 | 0.50 | 0.50 | 6000 |
| Weighted avg | 0.50 | 0.50 | 0.50 | 6000 |

Accuracy=(1502+1487)/6000=0.49816666666666665

Model with the implementation of the present disclosure such as SA module 145 in FIG. 1 or 200 in FIG. 2:

The model in which the associate expression may be an input. The assumption is that each statement has been heard by five participants which their expressions have been recorded.

The dictionary of the expressions:
In [11]: Expression_dictionary={
1: 'Normal',
2: 'Sad',
3: 'happy',
4: 'proud',
5: 'fulfilled',
6: 'appreciate',
7: 'disapproves',
8: 'agreement', 9: 'angry',
10: 'confused'
}
The model built for the Algorithm:
In [15]: embedding_length=30
lstm unit=20
emb_input=Input(batch_shape=(None, no_of_exp))
emb_enc=Embedding(11, embedding_length, input_length=no+of_exp)
emb_enc_out=emb(emb_input)
enc_lstm=LSTM(lstm_unit, return_state=False)
enc_out=enc_lstm(emb_enc_out)
dense=Dense(1, activation='sigmoid')
dense_out=dense(enc_out)
exp_model=Model([emb_input], dense_out)
exp_model.summary( )
Model: "Model_1"

| Layer (type) | Output Shape | Param # |
| --- | --- | --- |
| Input_1 (InputLayer) | (None, 4) | 0 |
| Embedding_1(Embedding) | (None, 4, 30) | 330 |
| lstm_1(LSTM) | (None, 20) | 4080 |
| Dense_4 (Dense) | (None, 1) | 21 |

Total params: 4,431
Trainable params: 4,431
Non-trainable params: 0
The Model execution details are given below:

```
exp_model.compile(optimizer='adam' , loss='binary_crossentropy' , metrics=['accuracy'])
exp_model.fit(np.array(sent_expression[:sample_train]),np.array(exp_out_corpus[:sample_train
]),epochs=25,batch_size=2000,validation_split=0.1)
```

Confusion Matrix with this particular execution is:

| | [[3022 20] [2934 24]] | | | |
| --- | --- | --- | --- | --- |
| | precision | recall | f1-score | support |
| 0 | 0.51 | 0.99 | 0.67 | 3042 |
| 1 | 0.55 | 0.01 | 0.02 | 2958 |
| accuracy | | | 0.51 | 6000 |
| macro avg | 0.53 | 0.50 | 0.34 | 6000 |
| Weighted avg | 0.53 | 0.51 | 0.35 | 6000 |

Accuracy=(3022+24)/6000=0.5076666666666667

The results above show that the implementation of the present disclosure yielded more accurate results and was able to more correctly identify the actual sentiment.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for providing a sentiment score for a video meeting by evaluating expressions of participants during the video meeting, said computerized-method comprising:

in a computerized system comprising a processor, a database of video meeting recordings; a memory to store the database, said processor is configured to operate a Sentiment Analysis (SA) module, said SA module is configured to:

retrieving one or more recordings of a video meeting from the database of video meeting recordings of each participant in the video meeting and associating the one or more recordings with a participant;

dividing each retrieved recording into segments;

processing the segments in a Facial Expression Recognition (FER) system to associate each segment with a timestamped sequence of expressions for each participant in the video meeting; and processing each segment in an Artificial Neural Network (ANN) to yield a sentiment score for each statement for each participant, wherein a sentiment score of a statement for all participants in the video meeting is calculated by:

adding the sentiment score of a statement for each participant to yield a total sentiment score for a statement;

dividing the total sentiment score for a statement by a number of all the participants in the video meeting, to yield a score; and comparing the score with a predefined threshold to yield a final sentiment score for a statement for all participants, and wherein an overall sentiment score of a video meeting is calculated by:

adding the final sentiment score for a statement for participants for each statement to yield a total sentiment score for all statements;

dividing the total sentiment score for all statement by a number of all statements in the video meeting to yield a score; and comparing the score with a predefined threshold to yield an overall sentiment score for the video meeting.

2. The computerized method of claim 1, wherein the ANN is having a dense layer, and wherein the processing of each segment in the ANN is operated by applying a prebuilt and pretrained deep learning model.

3. The computerized method of claim 2, wherein e prebuilt deep learning model comprising a building stage comprising:

receiving one or more timestamped sequences of expressions;

tokenizing each timestamped sequence of expressions and then converting each tokenized timestamped sequence of expressions into a word vector;

embedding the word vector into a matrix of a preconfigured size vectors;

converting each expression in the word vector into an integer to yield a numerical vector;

padding the numerical vector into a preconfigured size;

embedding the numerical vector into a matrix of vectors, wherein each vector in the matrix of vectors, represents a number in the numerical vector, and wherein for each number in the numerical vector assigning a preconfigured number of random weights to yield a matrix of a predefined size vectors;

providing each vector of the embedded matrix to a deep learning system to yield a final vector in a preconfigure size;

providing the final vector to the dense layer to receive one or more neurons which indicate a sentiment score for each statement for each participant; and converting each indicated sentiment score into '0' or '1' according to a predefined threshold.

4. The computerized method of claim 3, wherein the dense layer comprising one or more neural layers, and wherein each neural layer is applying an activation function.

5. The computerized method of claim 3, wherein a loss function and an optimizer to reduce the loss function to minimum by reducing an error between an actual value and a predicted value of the deep learning model are applied on the dense layer.

6. The computerized method of claim 3, wherein the deep learning system is selected from: a Recurrent Neural Network (RNN) system or Gated Recurrent Unit (GRU) system or Long Short Term Memory (LSTM).

7. The computerized method of claim 3, wherein the embedding of the word vector is performed by:

converting each expression in the word vector into an integer to yield a numerical vector;

padding the numerical vector by generating random numbers to fill up the numerical vector of a preconfigured size and constantly updating these numbers, by using backpropagation into a preconfigured size;

embedding the numerical vector into a matrix of vectors, wherein each vector in the matrix of vectors, represents a number in the numerical vector, and wherein for each number in the numerical vector assigning a preconfigured number of random weights to yield a matrix of a predefined size vectors.

8. The computerized method of claim 3, wherein the pretrained deep learning model comprises a training stage comprising:

running the deep learning model with some proportionate values of hatch size and epochs of video meeting recordings having an audio;

converting the audio of the video meeting into one or more text statements;

dividing each retrieved recording into segments;

processing the segments in a Facial Expression Recognition (FER) system to associate every segment with a timestamped sequence of expressions;

associating each of the one or more text statements with a segment of the video meeting recording;

processing each segment in a prebuilt deep learning model having a dense layer, to yield a sentiment score for each statement; and comparing the yielded sentiment score with a preconfigured sentiment score and adjusting weights of each neural layer of the ANN, accordingly.

9. The computerized method of claim 1, wherein a sentiment score of a statement for a participant in the video meeting is calculated by:

retrieving the timestamped sequence of expressions for the participant that is associated with the statement; and attributing a preconfigured sentiment score for the timestamped sequence of expressions for the participant to yield the sentiment score of a statement for the participant.

10. The computerized method of claim 1, wherein the PER system is implemented in an open source computer vision and machine learning software library.

11. The computerized method of claim 10, wherein the open source computer vision and machine learning software library is an Open Source Computer Vision (OpenCV) Library.

12. The computerized method of claim 1, wherein the activation function is 'sigmoid' to yield a single neuron or 'softmax' to yield multiple neurons for more than two distinct sentiments.

* * * * *